United States Patent
Kim

(10) Patent No.: US 10,755,043 B2
(45) Date of Patent: Aug. 25, 2020

(54) METHOD FOR REVISING ERRORS BY MEANS OF CORRELATION DECISIONS BETWEEN CHARACTER STRINGS

(71) Applicant: NAVER CORPORATION, Seongnam-si (KR)

(72) Inventor: Min Chul Kim, Seoul (KR)

(73) Assignee: NAVER Corporation, Seongnam-si (KR)

(*) Notice: Subject to any disclaimer, the term of this patent is extended or adjusted under 35 U.S.C. 154(b) by 218 days.

(21) Appl. No.: 14/131,538

(22) PCT Filed: Nov. 28, 2013

(86) PCT No.: PCT/KR2013/010910
§ 371 (c)(1),
(2) Date: Jan. 8, 2014

(87) PCT Pub. No.: WO2015/072612
PCT Pub. Date: May 21, 2015

(65) Prior Publication Data
US 2016/0132471 A1    May 12, 2016

(30) Foreign Application Priority Data
Nov. 13, 2013 (KR) .......................... 10-2013-0137964

(51) Int. Cl.
*G06F 40/00* (2020.01)
*G06F 40/232* (2020.01)
(Continued)

(52) U.S. Cl.
CPC ........ *G06F 40/232* (2020.01); *G06F 16/3344* (2019.01); *G06F 40/166* (2020.01)

(58) Field of Classification Search
CPC .... G06F 17/00; G06F 17/273; G06F 16/3344; G06F 17/24; G06F 40/232; G06F 40/166
(Continued)

(56) References Cited

U.S. PATENT DOCUMENTS 5,276,741 A * 1/1994 Aragon .................... G06F 7/02
                                                    382/229
6,047,300 A   4/2000 Walfish et al.
(Continued)

FOREIGN PATENT DOCUMENTS

KR    10-2012-0102260    9/2012
KR       10-1294558      8/2013

OTHER PUBLICATIONS

KIPO Office Action dated Dec. 19, 2013 of the corresponding Korean Patent Application No. 10-2013-0137964, noting listed reference in this IDS.
(Continued)

*Primary Examiner* — Cesar B Paula
*Assistant Examiner* — David Faber
(74) *Attorney, Agent, or Firm* — Greer, Burns & Crain, Ltd.

(57) ABSTRACT

The present invention relates to a method for revising an error, wherein a user inputs a desired character string for revision so as to calculate a correlation between the desired character string for revision and previously inputted character strings, so that a character string with a high correlation is replaced with the desired character string for revision. A characteristic configuration of the present invention is in a step for deciding a correlation. According to the present invention, in the step for deciding a correlation, a plurality of error-revising operations are defined, an error-revising operation score is given to each of the plurality of error-revising operations, a total of scores are calculated in such (Continued)

a way that scores are summed up for each of the error-revising operations required for revising a previously inputted character string into a desired character string for revision, wherein, if the number of cases of error-revising operations selectable for revision are plural, a score of a case in which a total of scores become a minimum is used for deciding a correlation. A total of scores calculated in such a way are compared with a predetermined threshold, thereby implementing a correlation decision.

20 Claims, 8 Drawing Sheets

(51) Int. Cl.
*G06F 16/33* (2019.01)
*G06F 40/166* (2020.01)

(58) Field of Classification Search
USPC .................................................. 715/257, 255
See application file for complete search history.

(56) References Cited

U.S. PATENT DOCUMENTS

| | | | |
|---|---|---|---|
| 6,618,697 B1* | 9/2003 | Kantrowitz | G06F 40/253 703/22 |
| 6,690,364 B1 | 2/2004 | Webb | |
| 6,801,190 B1 | 10/2004 | Robinson et al. | |
| 7,286,115 B2* | 10/2007 | Longe | G06F 3/0236 345/156 |
| 8,077,983 B2* | 12/2011 | Qiu | G06F 40/232 382/229 |
| 8,201,087 B2* | 6/2012 | Kay | G06F 3/0237 715/257 |
| 8,225,203 B2* | 7/2012 | Unruh | G06F 3/0237 345/172 |
| 8,493,344 B2* | 7/2013 | Fleizach | G06F 3/04883 345/173 |
| 9,081,761 B1* | 7/2015 | Little | G06F 17/3064 |
| 9,275,036 B2* | 3/2016 | Bodin | G06F 40/232 |
| 9,547,639 B2* | 1/2017 | Kim | G06F 40/232 |
| 10,229,108 B2* | 3/2019 | Bodin | G06F 40/274 |
| 10,310,628 B2 | 6/2019 | Kim | |
| 2002/0095448 A1* | 7/2002 | Selby | G06F 40/232 715/257 |
| 2006/0271502 A1* | 11/2006 | Yajima | G06F 40/166 |
| 2008/0178076 A1* | 7/2008 | Kritt | G06F 40/232 715/257 |
| 2009/0113293 A1* | 4/2009 | Schubert | G06F 16/9577 715/256 |
| 2009/0193088 A1 | 7/2009 | Cervantes et al. | |
| 2011/0205182 A1 | 8/2011 | Miyazawa et al. | |
| 2012/0246133 A1 | 9/2012 | Hsu et al. | |
| 2014/0104175 A1* | 4/2014 | Ouyang | G06F 17/2735 345/168 |
| 2014/0164973 A1* | 6/2014 | Greenzeiger | G06F 40/232 715/773 |
| 2014/0317495 A1 | 10/2014 | Lau et al. | |
| 2016/0132129 A1 | 5/2016 | Kim | |
| 2016/0132471 A1 | 5/2016 | Kim | |

OTHER PUBLICATIONS

U.S. Appl. No. 14/126,142, filed Dec. 13, 2013.
Kim, Min Chul, Office Action issued in U.S. Appl. No. 14/126,142, dated Mar. 11, 2016.
Kim, Min Chul, Office Action issued in U.S. Appl. No. 14/126,142, dated Jan. 9, 2018.
Kim, Min Chul, Office Action issued in U.S. Appl. No. 14/126,142, dated Jun. 1, 2018.

* cited by examiner

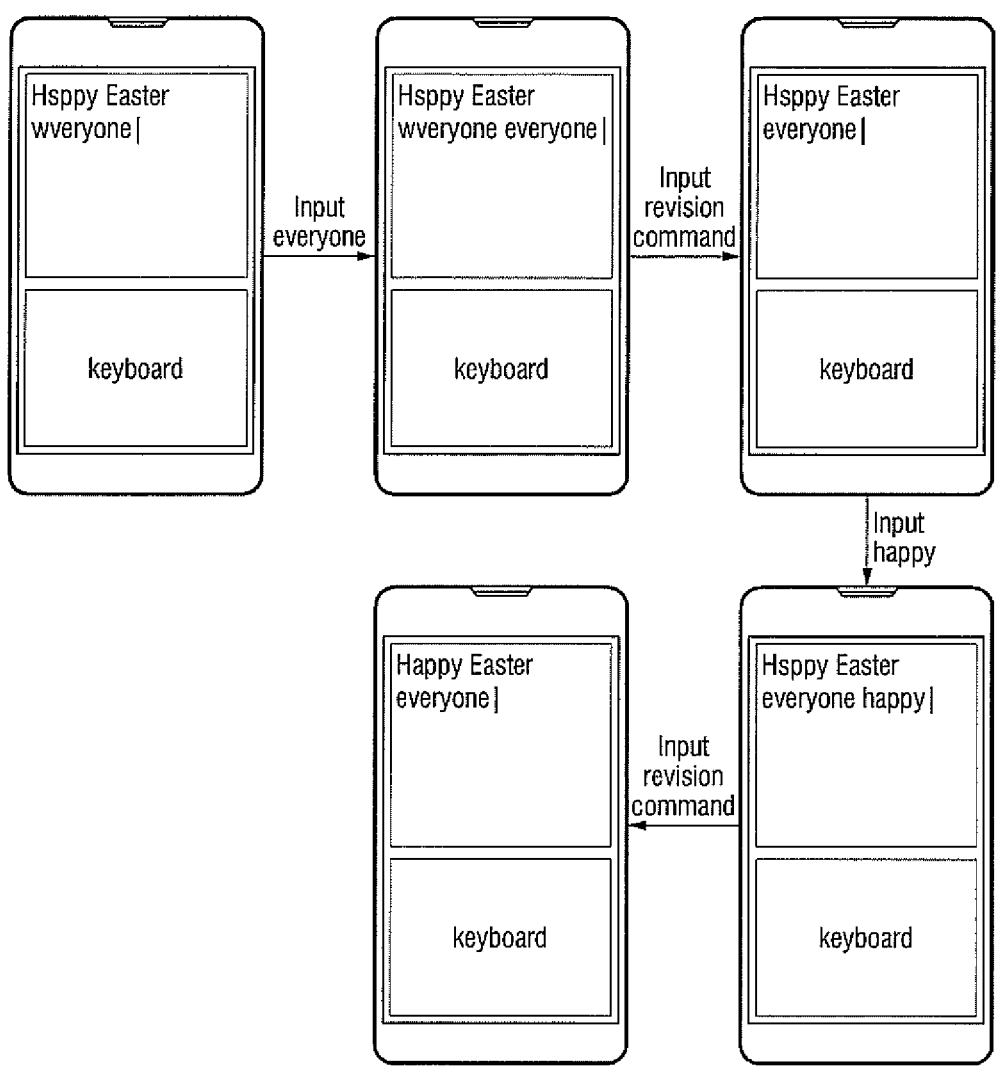

[FIG. 2]
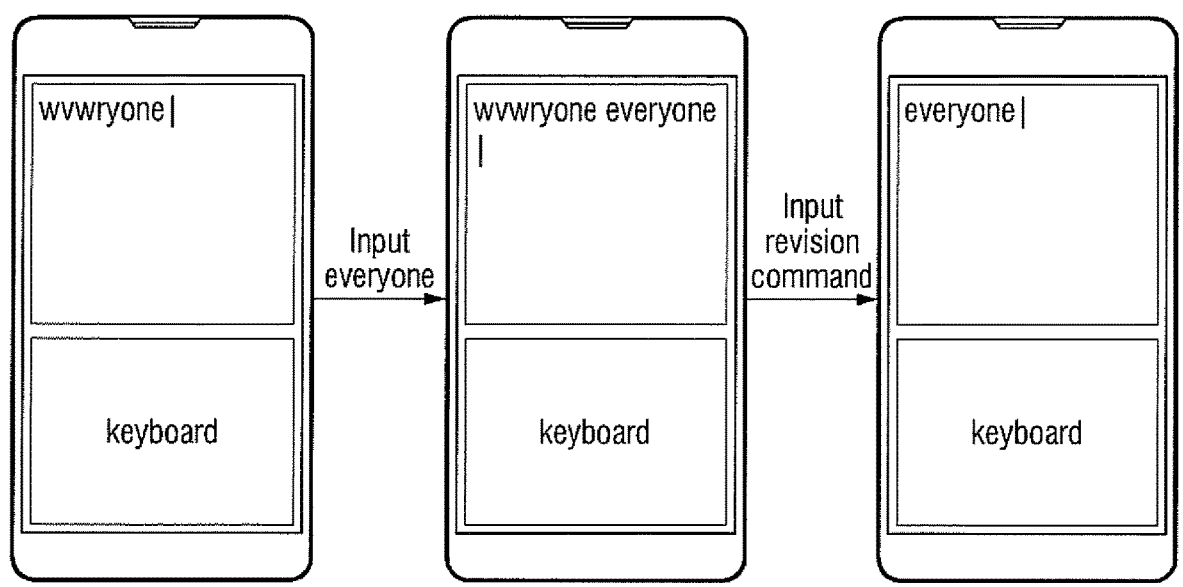

[FIG. 3]
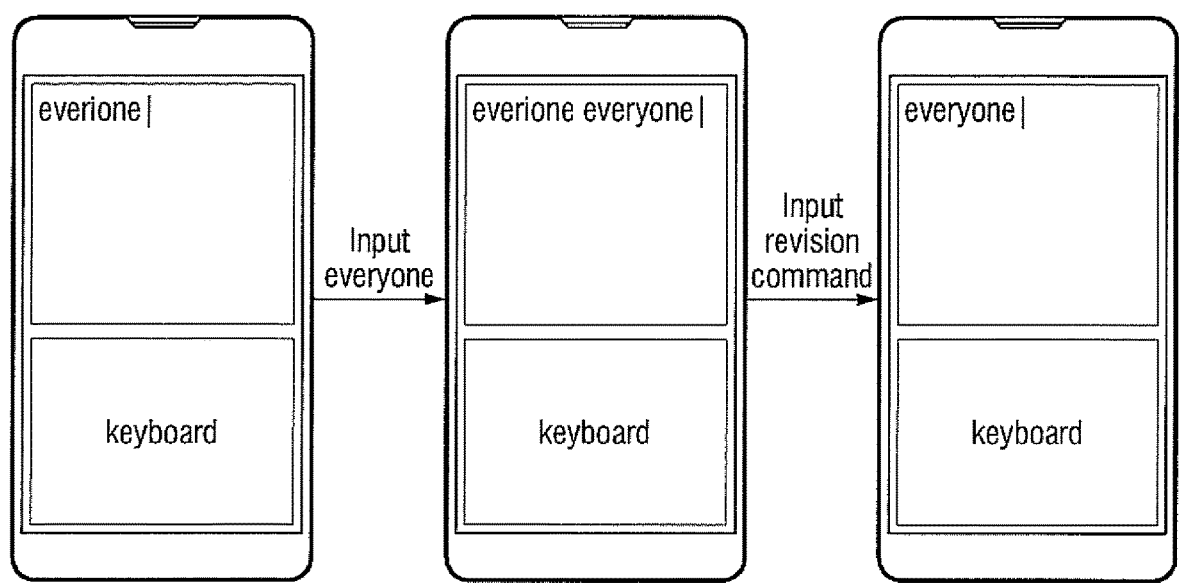

[FIG. 4]
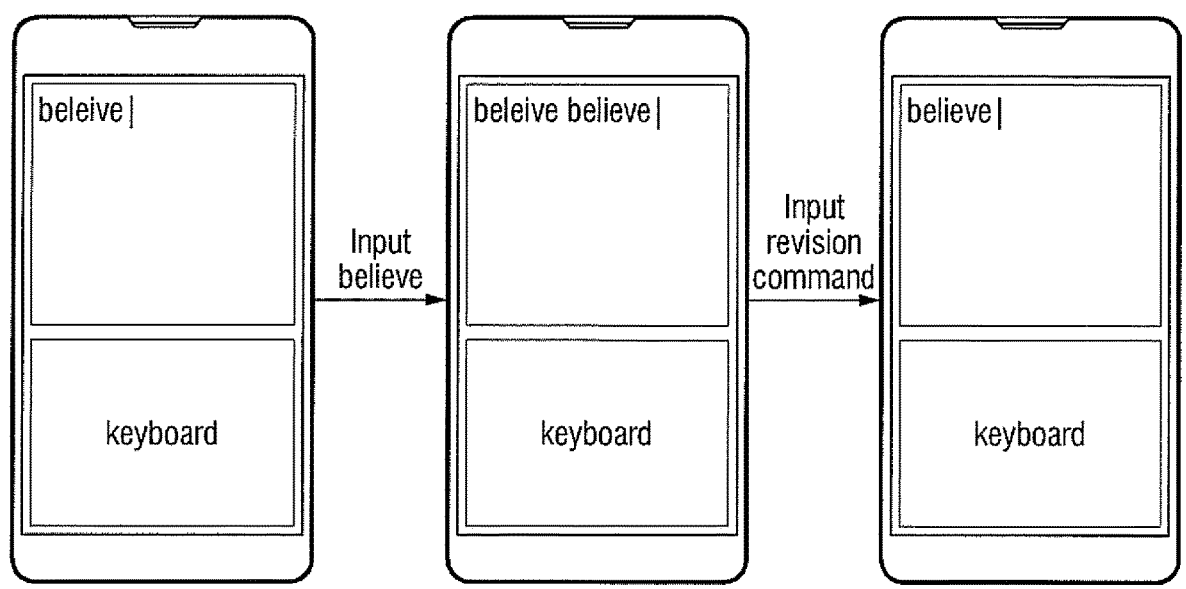

[FIG. 5]
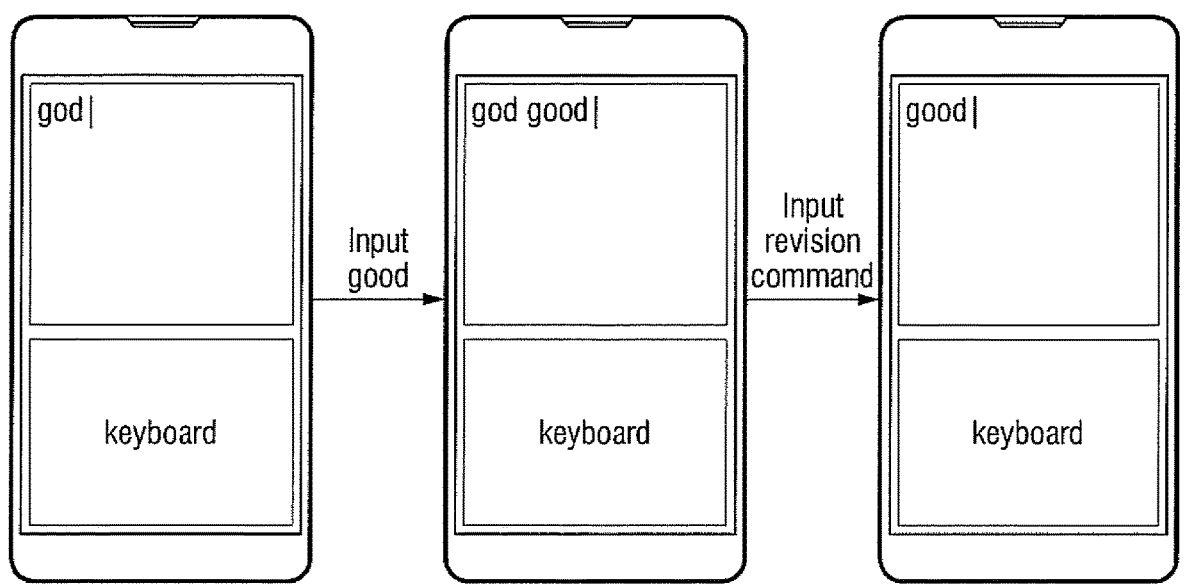

[FIG. 6]
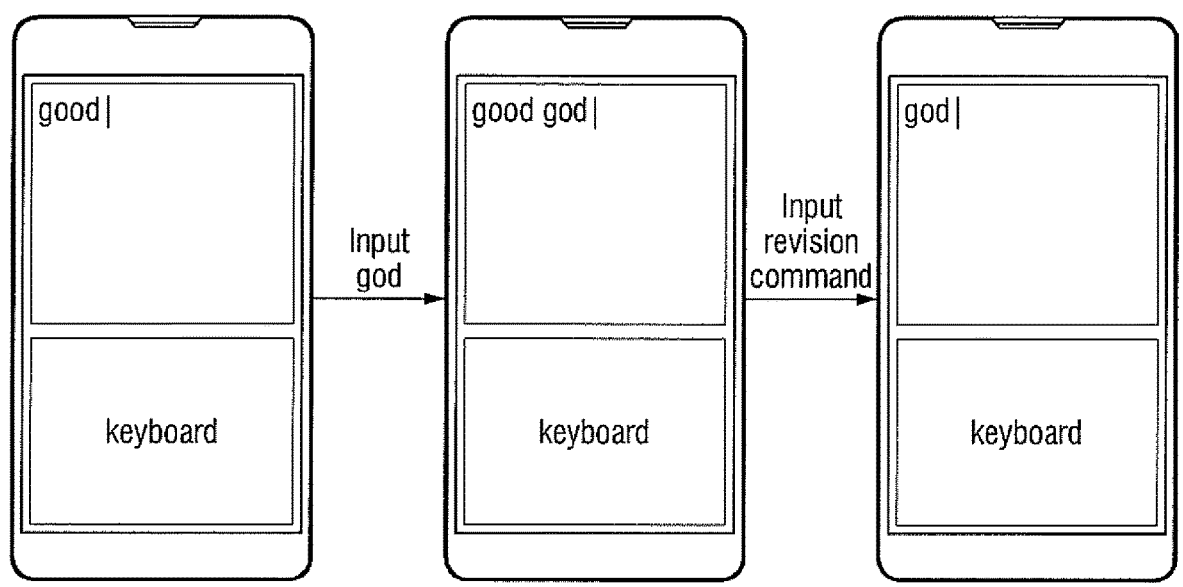

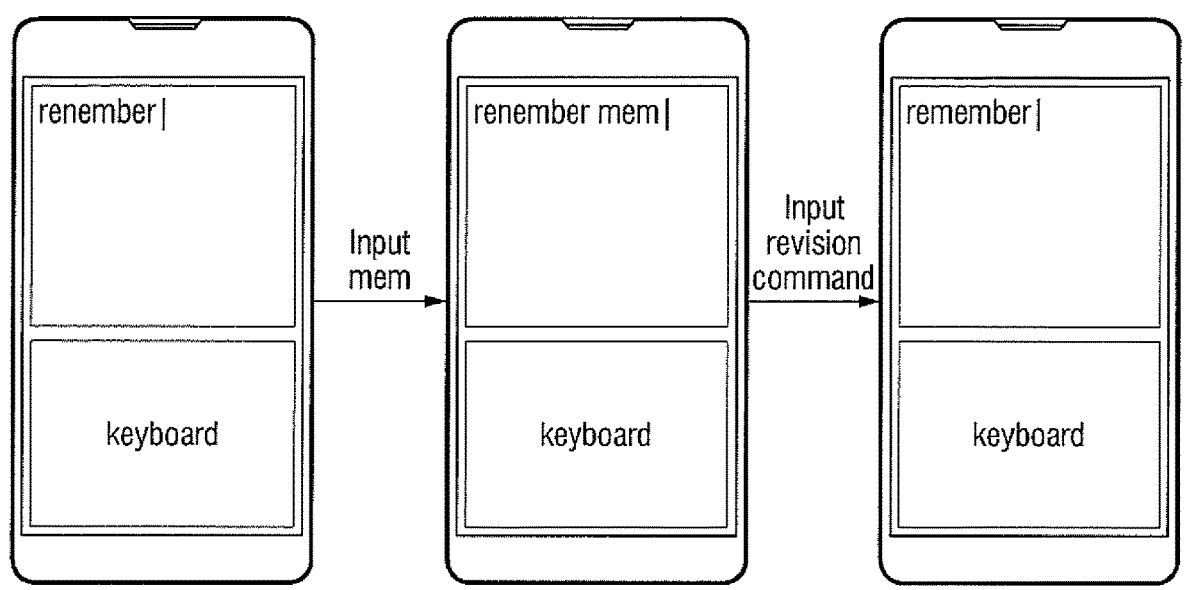
[FIG. 7]

[FIG. 8]
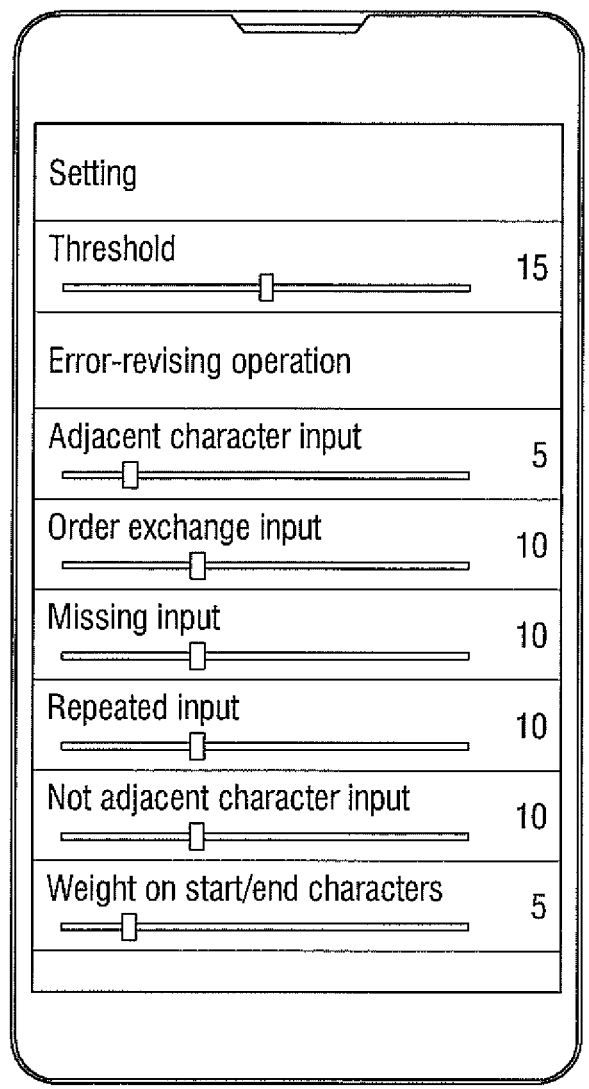

METHOD FOR REVISING ERRORS BY MEANS OF CORRELATION DECISIONS BETWEEN CHARACTER STRINGS

CROSS-REFERENCE TO RELATED APPLICATION(S)

This is a National Phase Patent Application and claims priority to and the benefit of International Application No. PCT/KR2013/010910, filed on Nov. 28, 2013, which claims priority to and the benefit of Korean Patent Application No. 10-2013-0137964, filed on Nov. 13, 2013, the disclosures of which are hereby incorporated by reference in their entireties.

TECHNICAL FIELD

The present invention relates to a method for revising an error by means of a correlation decision between character strings inputted on a mobile device like a smart phone, a PC or the like.

BACKGROUND ART

In case that an error occurs while inputting a character (referred to as all forms of characters that can be inputted, including English, Korean, numbers, special characters and the like) on a PC or a mobile device, a conventional method for revising an error is to delete all the characters, which were inputted after an erroneous character, by using a delete function key like Backspace, and then input a correct character, or move a cursor to the erroneous character by using a mouse (for a PC) or a finger touch (for a mobile device), and then delete the erroneous character, and then input a correct character so that the error is revised.

However, the method for revising an error by using a delete function key such as Backspace and the like has a problem in that not only an erroneous character but also other characters normally inputted between the erroneous character and a current cursor position are all deleted. Also, the method for moving a cursor to an erroneous character by using a mouse has the problem in that it requires a user to take a hand off the keyboard and use the mouse to move the cursor to a desired position, and then perform the action of revising the error and moving the cursor to its previous position again; so, the actions are troublesome and time-consuming. The same is true for a case of moving a cursor by means of a finger touch. In the case that a device has a small-sized touch screen such as a mobile device, it is necessary to move the cursor to a desired position by means of a finger touch within a small screen, so it is more difficult and troublesome to move the cursor to a precise position.

To solve the problems above, there is a method for revising an error, what is called an automatic revising function. This function has already been commercialized and mounted on various mobile devices, wherein, when a user inputs a word A and if it is decided that the word A is an error, the word A is automatically revised into word B. Word B, which is automatically revised and inputted, is not something that is directly inputted by a user, but something that has been already inputted in a library.

As such, since the conventional automatic revising function sets an input word for revision, not a word that a user inputs with an intention of revising, but a word that a system presumes that a user might have inputted, if the accuracy of such presumption is low, there is a problem in that a wrong word that a user never intended to input is actually inputted. This is partially based on which there is a limit to words registered to the library. Since users frequently use newly coined words or abbreviations on a current PC or a mobile device, unless the library is frequently updated, a problem caused by the limit to the library can occur more frequently. For that reason, although the automatic revising function is mounted on devices, many users turn off the function, thereby inputting characters without the function working.

To address such problems of the conventional automatic revising function, this inventor has invented a completely new method for revising an error. In the new method for revising an error designed by this inventor, when a user inputs a new character string and gives a command of revision, the new, inputted character string is recognized as a desired character string for the revision that the user desires, the new character string is compared with already inputted character strings, and it is decided that a character string having a high correlation with the new character string among the already inputted character strings is a candidate character string to be revised, thereby being replaced with the new character string. In addition to the method in which a user gives a direct command of revision, a method in which a system automatically figures out a user's intention of revising is also possible. Such new method for revising an error is registered to Korea Patent Registration No. 10-1294558.

In the above new method for revising an error, since a wrongly inputted character string is replaced with a new character string that a user newly inputs with an intention of revising, it is possible to provide an error revising function that suits a user's intention in comparison with the conventional automatic revising function. Since the method for revising an error operates in such a way that a correlation between a desired character string for revision that a user newly inputs with an intention of revising and an already inputted character strings is decided so as to replace a character string having a high correlation, the accuracy of the error revising function is determined according to the accuracy of deciding a correlation between character strings.

As provided in the specification of Korea Patent Registration No. 10-1294558, as a method for deciding a correlation, in the conventional automatic revising function, it is possible to use a conventional method for deciding a correlation between a word that a user actually inputs and a word in a library, for example, a method for deciding a correlation based on characters adjacent to each other on a keyboard or characters of which input orders are reversed. However, such conventional method fails to carry out the quantification of correlation decisions, when comprehensively considering various typing errors that can be caused by a user. Also, error typing habits, which are different among users, are not considered in a quantitatively accurate way when deciding a correlation. Moreover, according to the method for revising an error of Korea Patent Registration No. 10-1294558, a new function, in which a word including an already inputted error is not inputted as a whole, only an erroneous character string is replaced with a correct character string, is implemented, the conventional method for deciding a correlation does not consider the particularity of deciding a correlation between partial character strings.

Therefore, there is a need for a new method for deciding a correlation in order to more accurately implement the method for revising an error of Korea Patent Registration No. 10-1294558.

DISCLOSURE

Technical Problem

The objective of the present invention is to provide a method for revising an error by means of a correlation decision between character strings so as to accurately select a target character string to be revised that suits a user's intention of revising among already inputted character strings.

Additionally, the objective of the present invention is to provide the quantification of correlation decisions, when comprehensively considering various typing errors that can be caused by a user.

Furthermore, the objective of the present invention is to consider different typing error habits among users in a quantitatively accurate way when deciding a correlation.

In addition, the objective of the present invention is to provide a method for accurately deciding a correlation, which considers the particularity of deciding a correlation between partial character strings, when implementing a function of replacing only an erroneous character string with a correct character string without inputting a word including an already inputted error again as a whole.

Technical Solution

The present invention provides a method for revising an error, wherein an error can be revised in accordance with a user's intention of revising. According to the present invention, the method for revising an error is based on an assumption that a desired character string for revision is inputted and a correlation between the desired character string for the revision and previously inputted character strings is decided, so that a character string having a high correlation with the desired character string for revision among the previously inputted character strings is replaced with the desired character string for revision. The present invention is characterized in that, in the method for revising an error, a method for deciding a correlation between the desired character string for revision and the previously inputted character strings is improved.

According to the present invention, in the method for deciding a correlation between the desired character string for revision and the previously inputted character strings, a plurality of error revising operations required for revising a character string inputted before the desired character string for revision into the desired character string for revision is defined first. A predetermined score is given to each of the plurality of error revising operations defined above. A total of scores are calculated in such a way that scores given to each of the error-revising operations are summed up for each occurrence of revising operations defined for revising a character string that are inputted before the desired character string for revision into a desired character string for revision. If the number of cases of error-revising operations selectable for revision is plural, a case in which a total of scores become a minimum is an optimal case, when revising the character string into the desired character string for revision. The score at that time, that is, the minimum score, is considered when deciding a correlation. A total of scores, which are summed up in such a way, are compared with a predetermined threshold. If the total of scores are less than or equal to the threshold, it is decided that the character string concerned has a high correlation with the desired character string for revision. A length of a target character string to be compared can be considered when making a comparison between the total of scores and the threshold. If a character string has a long length, there is a high possibility of including relatively many errors. Nevertheless, if a threshold is maintained to be the same, a case in which a total of scores exceeding the threshold may relatively frequently occur. Therefore, if a character string has a long length, it is possible to set to increase the threshold. If a character string has a short length, it is possible to set to reduce the threshold. As such, in addition to a method for adjusting a threshold according to a length of a target character string to be compared, it is also possible to implement a method for considering a length of a target character string to be compared in a total of scores given to each of error revising operations, for example, a method for contrasting a number acquired through calculation (a total of scores/the number of the character included in character strings to be compared) with a predetermined threshold.

According to the present invention, an error-revising operation used in the method for deciding a correlation includes an operation of replacing a character within a character string with a character adjacent thereto on a keyboard, an operation of replacing a character within a character string with a character not adjacent thereto on a keyboard, an operation of exchanging positions of two characters sequentially written in a character string, an operation of inserting a character into a character string, and an operation of deleting a character from a character string. As described above, a predetermined score is given to each of operations. Scores given to each of error-revising operations may be the same as or different from each other.

Also, according to the present invention, in the method for revising an error, it is possible to replace only an erroneous character string with a correct character string without inputting a word including an already inputted error again as a whole. To that end, weight is given to a first character and a last character of a desired character string for revision that is inputted by a user.

A weighting method is implemented in such a way that, after summing up scores given to each of the error-revising operations mentioned above, if a first character of a character string compared with a desired character string for revision is neither the same as nor adjacent to a first character of a desired character string for revision, a predetermined extra score is given thereto, and if a last character of a character string compared with a desired character string for revision is neither the same as nor adjacent to a last character of a desired character string for revision, a predetermined extra score is given thereto.

According to the present invention, scores given to each of the error-revising operations can be so configured that the scores are adjusted according to a frequency of occurrence of the error-revising operation concerned. For example, if a case in which positions of two characters sequentially included in a character string are reversed and inputted by a user frequently occurs, a score given to such error-revising operation is gradually adjusted to be low, thereby increasing a possibility of deciding that a character string having the same error pattern has a high correlation with the desired character string for revision. By doing so, a user customizing is achieved.

According to the present invention, it is common that scores given to each of the error-revising operations have scores having the highest generality by means of a user investigation; however, a user can directly set or revise scores.

Advantageous Effects

According to the present invention, when comprehensively considering various typing errors that can be caused by a user, the quantification of correlation decisions is provided, thereby drastically increasing the accuracy of the correlation decisions.

Also, according to the present invention, it is possible that scores given to each of the error-revising operations are adjusted according to a frequency of occurrence of the error-revising operation concerned, thereby providing an intelligent method for correlation decisions adapted to a user's typing error habits. This also makes a great contribution in increasing the accuracy of correlation decisions.

Additionally, according to the present invention, a weight is given to a first character and a last character of two character strings compared in a method for deciding a correlation, so it is possible to more accurately implement a method for replacing only an erroneous character string with a correct character string without inputting a word including an already inputted error again as a whole.

Moreover, according to the present invention, a user can directly set or revise a score given to each of the error-revising operations, so that it is possible to reflect a user's intention on a correlation decision beforehand.

DESCRIPTION OF DRAWINGS

FIG. 1 illustrates an exemplary embodiment that revises an error within a character string inputted by a user's command of revision.

FIG. 2 illustrates an error-revising operation that revises some character into adjacent character on a keyboard for revising a wrong character string into a correct character string.

FIG. 3 illustrates an error-revising operation that revises some character into nonadjacent character on a keyboard for revising a wrong character string into a correct character string.

FIG. 4 illustrates an error-revising operation that revises a character string, of which two sequential character positions are inverted, into a correct character string.

FIG. 5 illustrates an error-revising operation that revises a character string having an unnecessary character added thereto, into a correct character string.

FIG. 6 illustrates an error-revising operation that revises a character string having a necessary character missing therefrom, into a correct character string.

FIG. 7 illustrates an error-revising operation that inputs a desired character string for revision for only part of an erroneous character string so as to revise the error.

FIG. 8 illustrates an example of a setting screen configured in such a manner that a user sets an error-revising operation score.

MODE FOR INVENTION

FIG. 1 illustrates an exemplary embodiment that revises an error within a character string inputted by a user's command of revision. In FIG. 1, a user intended an input of "Happy Easter everyone", but actually inputted "Hsppy Easter wveryone". A user has an error of "wveryone", first. In order to revise the error, the user leaves a space next to "Hsppy Easter wveryone" and inputs "everyone". Then, a user gives a command of revision. This command of revision can be performed in various forms. A button for the command of revision can be separately formed within a device, or it can be so configured that an operation of slightly shaking a mobile device or a touch operation of moving a keyboard region in four directions is recognized as the command of revision. In any way, if the command of revision is given after the input of "everyone", a system recognizes "everyone" as the desired character string for revision.

Afterwards, a correlation between "everyone", which is the desired character string for revision, and the previously inputted character strings is calculated. Since "wveryone", out of the already inputted character strings, has a high correlation with "everyone", which is the desired character string for revision, "wveryone" is replaced with "everyone", and "Hsppy Easter wveryone everyone is revised into "Hsppy Easter everyone". A specific method for deciding a correlation is described later. In this state, a user additionally has the error of "Hsppy", leaves a space next to "everyone", inputs a correct character string of "happy", and gives a command of revision again. Then, "happy" is recognized as a desired character string for revision, and a correlation with the already inputted character strings is calculated. As a result of the calculation, since "Hsppy" has a high correlation with "happy", "Hsppy" is replaced with "happy". During this process, it is recognized that "happy" is the first word of a sentence, and "h" is changed into a uppercase letter character, so that "Hsppy Easter everyone" is replaced with "Happy Easter everyone". By doing so, the revision process is completed. It is possible to freely set whether to contrast a desired character string for revision with a certain range of previously inputted character strings to calculate a correlation, for example, whether to contrast with previously inputted 10 character strings or 100 character strings, or character strings of an entire document according to a system environment.

FIGS. 2 to 6 illustrate a variety of error occurrence types and resulting error-revising operations.

FIG. 2 illustrates a case in which some characters within a character string are incorrectly inputted characters adjacent thereto on a keyboard. In FIG. 2, a user intended an input of "everyone", but actually inputted "wvwryone". If a user finds an error of "wvwryone", inputs "everyone" to revise the error, and gives a command of revision, "everyone" is recognized as a desired character string for revision and a correlation with already inputted character strings is calculated. At this time, "everyone" and "wvwryone" have only a difference in whether first and third characters thereof are e or w, respectively. The characters e and w are input keys disposed to be adjacent to each other on a keyboard, so there is a high possibility that w might have been wrongly inputted, replacing e. Therefore, "wvwryone" is selected as a candidate character string to be revised having a high correlation with "everyone", and revised into "everyone", which is the desired character string for revision.

FIG. 3 illustrates a case in which some characters within a character string are incorrectly inputted characters not adjacent thereto on a keyboard. In FIG. 3, a user intended to input "everyone", but actually inputted "everione". In case of making a comparison between a wrongly inputted character string ("everione") by a user and an actually intended correct character string ("everyone"), it can be known that two character strings have only a difference in whether a fifth character is i or y. However, as shown in FIG. 2, it can be assumed that it is determined that characters, which are differently inputted in both character strings, have a high correlation only if the characters are adjacent to each other on a keyboard. However, on such an assumption, in case of FIG. 3, the characters i and y are not adjacent to each other, so "everione" is not selected as a character string having a high correlation with "everyone", which is the desired character string for revision, and an error is not revised.

The present invention is configured in such a manner that various error-revising operations are defined, an error revising operation score is given to each of the error-revising operations, and a total of error-revising operation scores necessary for revising an already inputted character string into a newly inputted desired character string for revision is compared with a predetermined threshold so as to determine if the already inputted character string has a high correlation with the newly inputted desired character string for revision, thereby not excluding a case in which characters not adjacent to each other on a keyboard are wrongly inputted as shown in FIG. 3.

Specifically, in an exemplary embodiment of the present invention, it is so configured that it is decided that two character strings correspond to character strings having a high correlation with each other, if a total of error revising operation scores are less than or equal to a predetermine threshold. For example, in this exemplary embodiment of the present invention, respective error-revising operation scores are given to all the operations of revising characters within a character string like FIGS. 2 and 3. However, in the case of characters adjacent to each other on a keyboard like FIG. 2, there is a higher possibility that errors occur thereto in comparison with characters not adjacent to each other on a keyboard like in FIG. 3. Therefore, in case of revision into a character not adjacent thereto on a keyboard like in FIG. 3 in order to reflect such possibility of occurrence on a correlation decision, it is preferable that an error-revising operation score thereof is higher than a score given to an error-revising operation of FIG. 2. In the present exemplary embodiment, a score of 5 is given to an error-revising operation of FIG. 2 and a score of 10 is given to an error-revising operation of FIG. 3. Also, in the present exemplary embodiment, a reference value (a threshold of the error-revising operation score) to compare such error-revising operation score is set to a score of 15.

According to such a method for deciding a correlation, in FIG. 2, in order to revise "wvwryone" into "everyone", which is a desired character string for revision, there is a need for an operation of revising w, which are the first and third characters, respectively, into e, which is a character adjacent thereto on a keyboard. It is set to give a score of 5 to an operation of revising the first character w into e and give a score of 5 to an operation of revising the third character w into e, so that the error-revising operation score is a total of 10. Here, the error-revising operation score of 10 is smaller than 15, which is a threshold of the error revising operation score; so, it is determined that two character strings have a high correlation and "wvwryone" is selected as a candidate character string to be revised with regard to "everyone", which is the desired character string for revision.

Also, in FIG. 3, in order to revise "everione" into "everyone", there is a need for a single operation of revising i, which is the fourth character, into y. At this time, since i and y are not adjacent to each other on a keyboard, a score of 10 is given to such error-revising operation. The error-revising operation score of 10 is smaller than 15, which is a threshold of the error-revising operation score, so it is determined that the two character strings have a high correlation and "everione" is selected as a candidate character string to be revised with regard to "everyone", which is the desired character string for revision FIG. 4 illustrates a case in which two sequential characters in a character string are inversely inputted. In FIG. 4, a user intended to input "believe", but actually inputted "beleive". In this case, the simplest operation of revising the error is to exchange the fourth character e with the fifth character i. However, in order to revise "beleive" into "believe" according to the error-revising operation described with regard to FIGS. 2 and 3, it is necessary to change the fourth character e into i, and change the fifth character i into e. Therefore, characters not adjacent to each other on a keyboard are changed twice; so, an error-revising operation score of 20 in total is given thereto. The error-revising operation score of 20 is larger than a threshold of 15, so it is determined that "beleive" has no correlation with "believe", which is the desired character string for revision, and the error is not revised. In fact, a case in which such sequential characters are inversely inputted frequently occurs the process of inputting characters at a fast speed.

Nevertheless, in the case of deciding a correlation between character strings only according to the method for deciding the correlation described with respect to with FIGS. 2 and 3, there is a problem in that such frequent error cannot be revised as shown in FIG. 4.

In the present exemplary embodiment, to address such problem, an operation of exchanging the orders of the two sequential characters inputted within a character string with each other is defined as a separate error-revising operation, and an error-revising operation score of 8 is given to the operation. In an example illustrated in FIG. 4, "beleive" can be revised into "believe", which is a desired character string for revision, according to an operation of exchanging the positions of the fourth character e and a fifth character i with each other. Therefore, an error-revising operation score of 8 is given thereto and such score is smaller than a threshold of 15; so, it is determined that "beleive" has a high correlation with "believe", which is a desired character string for revision, thereby revising "beleive" into "believe".

FIGS. 5 and 6 illustrate a case in which an error occurs because an unnecessary character is inserted into a character string inputted or a necessary character is missing therefrom. FIG. 5 shows a case in which an input of "god" was intended, but an unnecessary character o was actually further inserted between g and d, so "good" is inputted. FIG. 6 shows a case in which an input of "good" was intended, but o is inadvertently missing therefrom, so "god" is inputted. In fact, such error may easily occur during a process of inputting characters at a fast speed. In this case, the incorrectly typed character string can be revised by means of a revising operation of deleting the unnecessarily inserted character o (in the case of FIG. 5) or adding the missing character o (in the case of FIG. 6). However, since the error-revising operation ("a replacement of a wrong character" or "an exchange of positions between adjacent characters") illustrated in FIGS. 2 to 4 decides a correlation with a character string having the same length as a newly inputted desired character string for revision. In the case that an unnecessary character is inserted into a character string like FIG. 5 or a necessary character is missing therefrom like FIG. 6, it is not decided that such character strings have a correlation with the desired character string for revision.

In the present exemplary embodiment, to address such problem, an operation of deleting a character from a character string or adding a character to a character string is defined as a separate error-revising operation, and an error-revising operation score of 10 is given to the operation.

In the example illustrated in FIG. 5, "god" can be revised into "good" by means of an operation of adding o between the first character g and the last character d. In FIG. 6, "good" can be revised into "god" by means of deleting o from the oo inputted between the first character g and the last character d. Therefore, an error-revising operation score of 10 is given to each of the revising operations illustrated in FIGS. 5 and 6. Here, the error-revising operation score of 10 is smaller than a threshold of 15, so it is determined that the character strings thereof have a high correlation with the desired character string for revision so as to be selected a candidate group of character strings to be revised.

As described above, the present invention is configured in such a manner that it is possible to select a candidate character string to be revised having a high correlation with a desired character string for revision by (i) defining a plurality of error-revising operations in order to cover various error types, (ii) giving an error-revising operation score to each of the error-revising operations, (iii) calculating a minimum value of a total of error-revising operation scores necessary for revising an already inputted character string into a newly inputted desired character string for revision, and (iv) comparing a total of such error-revising operation scores with a predetermined threshold, so it is possible to provide an error revising method that can revise an error by more accurately reflecting a user's intention of revision.

FIG. 7 illustrates a case that a user finds an error in an inputted character string and inputs a desired character string for revision with regard to only a part of the character string included in an entire character string so as to revise the error. In FIG. 7, a user intended to input "remember", but actually inputted "renember". At that time, in order to revise the error in a fast and economical way, it is preferable to input a desired character string for revision with regard to only a part of a character string including an erroneous character rather than newly input a desired character string for revision with regard to an entire correct character string. In other words, in order to revise the error more economically in FIG. 7, it is preferable to input a desired character string for revision with regard to only a part of a character string (for example, "rem", "eme", "mem", . . . ) including an erroneous character, that is n (the third character), than newly input a desired character string for revision with regard to "remember", which is an entire correct character string. As such, when inputting a desired character string for revision with regard to only a part of a character string so as to revise an error, there may be many cases in which a user inputs a desired character string for revision from an incorrectly inputted character or inputs a desired character string for revision with regard to a character string up to an incorrectly inputted character (for example, inputting "mem" or "rem" in an exemplary embodiment of FIG. 7).

Therefore, in the case that an error-revising operation is performed for a start character or an end character of a character string, it is necessary to give weight to the error-revising operation. In the present exemplary embodiment, when an error-revising operation is performed for a start character or an end character of a character string, in the case that a previous or following character next to the character that is changing is a "character not adjacent thereto on a keyboard" having a low possibility of occurrence of errors, an extra score of 5 is added to the-error revising operation. According to such method, when revising a start character or an end character of an already inputted character sting in order to revise an already inputted character string into a desired character string for revision, (i) in the case that a character before and after the revision is a "character not adjacent thereto on a keyboard" having a low possibility of occurrence of errors, an extra score is given to the error-revising operation score, so such character string is easily excluded from a candidate group of character strings to be revised, and (ii) in case that the character is a "character adjacent thereto on a keyboard" having a high possibility of occurrence of errors, there is a higher probability for it to be maintained as a candidate character string to be revised. Hereinafter, the error-revising operation according to the present invention is described in detail through one example. FIG. 7 illustrates a case in which a user intended to input "remember", but actually inputted "renember". A user finds the error "renember" first, leaves a space next to "renember" to revise the error, and inputs "mem". Then, a user gives a command of revision. Once the command of revision is given, the system recognizes "mem" as a desired character string for revision, and then calculates a correlation between "mem" and a previously inputted character string.

First of all, the system starts to calculate a correlation for character strings ["ren", "ene", "nem", "emb", "mbe", "ber"] having the same length as "mem", which is a newly inputted desired character string for revision. Error-revising operation scores for respective character strings are as follows as described in the following table among character strings having the same length as the desired character string for revision; "nem" is the only one that has an error-revising operation score, which is less than or equal to the threshold (15) of the error-revising operation score. Therefore, only "nem" is selected as a candidate character string to be revised.

TABLE 1

| Character string to be compared | Desired character string for revision | Error revising operation scores |
|---|---|---|
| ren | mem | (1) Revising a first character into a character not adjacent thereto on a keyboard: 10 <br> (2) Revising a third character into a character adjacent thereto on a keyboard: 5 <br> (3) Revising a start character into a character not adjacent thereto on a keyboard: 5 extra <br> Error revising operation score: 20 |
| ene | mem | (1) Revising a first character into a character not adjacent thereto on a keyboard: 10 <br> (2) Revising a second character into a character not adjacent thereto on a keyboard: 10 <br> (3) Revising a third character into a character not adjacent thereto on a keyboard: 10 <br> (4) Revising a start character into a character not adjacent thereto on a keyboard: 5 extra <br> (5) Revising an end character into a character not adjacent thereto: 5 extra <br> Error revising operation score: 40 |
| nem | mem | (1) Revising a first character into a character adjacent thereto on a keyboard: 5 <br> Error revising operation score: 5 |
| emb | mem | (1) Revising a first character into a character not adjacent thereto on a key board: 10 <br> (2) Revising a second character into a character not adjacent thereto on a keyboard: 10 <br> (3) Revising a third character into a character not adjacent thereto on a keyboard: 10 <br> (4) Revising a start character into a character not adjacent thereto on a key board: 5 extra <br> (5) Revising an end character into a character not adjacent thereto on a keyboard: 5 extra |

TABLE 1-continued

| Character string to be compared | Desired character string for revision | Error revising operation scores |
|---|---|---|
| mbe | mem | Error revising operation score: 40<br>(1) Revising a second character into a character not adjacent thereto on a keyboard: 10<br>(2) Revising a third character into a character not adjacent thereto on a keyboard: 10<br>(3) Revising an end character into a character not adjacent thereto on a keyboard: 5 extra<br>Error revising operation score: 25 |
| ber | mem | (1) Revising a first character into a character not adjacent thereto on a keyboard: 10<br>(2) Revising a third character into a character not adjacent thereto on a keyboard: 10<br>(3) Revising a start character into a character not adjacent thereto on a keyboard: 5 extra<br>(4) Revising an end character into a character not adjacent thereto on a keyboard: 5 extra<br>Error revising operation score: 30 |

Then, as a method for "deleting an unnecessary character" or "adding a necessary character" as described based on character strings (for example, re, rene, . . . ) having a different length from a desired character string for revision, methods for revising an error are determined now. In the case of this example, among revising operations by means of such method, there is no revising operation having an error revising operation score less than or equal to 15. As a result, in this example, it is decided that nem is only a character string having a high correlation with mem, so nem is replaced with mem and renember is revised into remember. As such, in the present invention, comparison is made not only for character strings having the same length as a desired character string for revision, but also for character strings having a difference in length by one character or more, thereby improving the accuracy of the correlation decision.

Meanwhile, there are many cases in which the same user repeatedly causes a similar type of errors. Therefore, in order for a user to feel more satisfaction with the error-revising function, it is preferable for the device to memorize an error-revising operation that has occurred in the device and automatically adjust an error-revising operation score according to a frequency of occurrence of error-revising operations so as to be customized to suit a user's need. According to such configuration a low operation score is given to an error-revising operation that frequently occurs by a user and a high operation score is given to an error-revising operation that does not frequently occur by a user, so that a character string suitable for a type of errors that frequently occurs by a user can be selected easily as a candidate group of character strings to be revised and a user can feel full satisfaction with the error-revising function.

Also, it is preferable to configure in such a way that a user can directly set and revise an error-revising operation score given to each of the error-revising operations. FIG. 8 illustrates an example of a "setting" screen configured in such a way that a user can set and revise an error-revising operation score. A user can adjust an error-revising operation score for each of the error-revising operations to his/her taste by using a finger touch, etc. on the setting screen as illustrated in FIG. 8. By means of such configuration, a user can set a method for deciding a correlation, which suits his/her needs most, thereby feeling more satisfaction than any other error-revising functions.

The exemplary examples above are set forth to illustrate, but are not to be construed to limit the present invention, and it will be understood that those skilled in the art may perform various modifications and equivalent embodiments from the description without departing from the scope of the present invention.

The invention claimed is:

1. A computer implemented method, associated with program instructions, for revising an error, comprising the steps of:
   a first inputting step of inputting, via a user, one or more character strings, wherein the one or more character strings include at least one error;
   a second inputting step of inputting, via a user, a desired character string for revision;
   a calculating step of calculating, via the computer, a correlation between the desired character string for revision and the one or more character strings that were previously inputted, by the user, during the first inputting step, wherein the calculating step is performed after the second inputting step;
   automatically replacing, via the computer, a character string with a high correlation, as determined during the calculating step, with the desired character string for revision inputted by the user during the second inputting step, and
   wherein, in the step of calculating the correlation:
      a plurality of error-revising operations are defined,
      an error-revising operation score is given to each of the plurality of error-revising operations,
      a total of scores are calculated in such a way that scores given to each of the error-revising operations are summed up for each of the error-revising operations required for revising a previously inputted character string into a desired character string for revision,
      wherein, if the number of cases of error-revising operations selectable for revision are plural, a score of a case in which the total of the scores become a minimum is used for deciding the correlation, and
      a total of the scores calculated are compared with a predetermined threshold, thereby deciding the correlation.

2. The method of claim 1, wherein the defined plurality of error-revising operations comprise:
   an operation of replacing a character within a character string with a character adjacent thereto on a keyboard,
   an operation of replacing a character within a character string with a character not adjacent thereto on a keyboard,
   an operation of exchanging positions of two characters sequentially written in a character string,
   an operation of inserting a character into a character string, and
   an operation of deleting a character from a character string.

3. The method of claim 1, wherein, when calculating the correlation, after summing up scores given to each of the error-revising operations to calculate a total of scores, if a first character of a character string compared with a desired character string for revision is neither the same as nor adjacent to a first character of the desired character string for revision, a predetermined extra score is given thereto, and if a last character of the character string compared with the desired character string for revision is neither the same as nor adjacent to a last character of the desired character string for revision, a predetermined extra score is given thereto.

4. The method of claim 1, wherein the error-revising operation score is automatically adjusted, by the computer, according to a frequency of occurrence of error-revising operations.

5. The method of claim 1, wherein the error-revising operation score is directly set or revised by a user.

6. The method of claim 1, wherein a length of a target character string to be compared can be considered in such a way that a threshold is adjusted or a total of scores are adjusted according to a length of the target character string to be compared, when making a comparison between the total of scores calculated and the predetermined threshold.

7. The method of claim 1, wherein the step of automatically replacing is performed after the user enters a command of revision.

8. The method of claim 7, wherein the command of revision comprises activating a button formed within the computer.

9. The method of claim 7, wherein the command of revision comprises the user performing a shaking operation of the computer.

10. The method of claim 7, wherein the command of revision comprises the user performing a touch operation upon a screen of the computer.

11. A computer implemented method, associated with program instructions, for revising an error, comprising the steps of:
- a first inputting step of inputting, via a user, one or more character strings, wherein the one or more character strings include at least one error;
- a second inputting step of inputting, via a user, a desired character string for revision;
- a calculating step of calculating, via the computer, a correlation between the desired character string for revision and a plurality of character strings that were previously inputted, by the user, during the first inputting step, wherein the calculating step is performed after the second inputting step;
- automatically replacing, via the computer, a character string with a high correlation, as determined during the calculating step, which is one of the plurality of character strings, with the desired character string for revision inputted by the user during the second inputting step, wherein the character string being automatically replaced need not be directly adjacent the desired character string for revision input during the second inputting step, and
- wherein, in the step of calculating the correlation:
  - a plurality of error-revising operations are defined,
  - an error-revising operation score is given to each of the plurality of error-revising operations,
  - a total of scores are calculated in such a way that scores given to each of the error-revising operations are summed up for each of the error-revising operations required for revising a previously inputted character string into a desired character string for revision,
  - wherein, if the number of cases of error-revising operations selectable for revision are plural, a score of a case in which the total of the scores become a minimum is used for deciding the correlation, and
  - a total of the scores calculated are compared with a predetermined threshold, thereby deciding the correlation.

12. The method of claim 11, wherein the defined plurality of error-revising operations comprise:
- an operation of replacing a character within a character string with a character adjacent thereto on a keyboard,
- an operation of replacing a character within a character string with a character not adjacent thereto on a keyboard,
- an operation of exchanging positions of two characters sequentially written in a character string,
- an operation of inserting a character into a character string, and
- an operation of deleting a character from a character string.

13. The method of claim 11, wherein, when calculating the correlation, after summing up scores given to each of the error-revising operations to calculate a total of scores, if a first character of a character string compared with a desired character string for revision is neither the same as nor adjacent to a first character of the desired character string for revision, a predetermined extra score is given thereto, and if a last character of the character string compared with the desired character string for revision is neither the same as nor adjacent to a last character of the desired character string for revision, a predetermined extra score is given thereto.

14. The method of claim 11, wherein the error-revising operation score is automatically adjusted, by the computer, according to a frequency of occurrence of error-revising operations.

15. The method of claim 11, wherein the error-revising operation score is directly set or revised by a user.

16. The method of claim 11, wherein a length of a target character string to be compared can be considered in such a way that a threshold is adjusted or a total of scores are adjusted according to a length of the target character string to be compared, when making a comparison between the total of scores calculated and the predetermined threshold.

17. The method of claim 11, wherein the step of automatically replacing is performed after the user enters a command of revision.

18. The method of claim 17, wherein .the command of revision comprises activating a button formed within the computer.

19. The method of claim 17, wherein the command of revision comprises the user performing one of a shaking operation of the computer or a touch operation upon a screen of the computer.

20. The method of claim 1, wherein in the step of calculating the correlation, the desired character string for revision is compared to a predetermined number of the character strings that were previously inputted, wherein the predetermined number of character strings is greater than one.

* * * * *